(12) United States Patent
Woodford et al.

(10) Patent No.: US 7,717,773 B2
(45) Date of Patent: *May 18, 2010

(54) POULTRY STUNNING SYSTEM

(75) Inventors: Richard Woodford, Kellyville, OK (US); Kenneth Rutledge, Huron, SD (US); John Gregory Skinner, Huron, SD (US); David Allen Coolbaugh, Huron, SD (US)

(73) Assignee: Dakota Turkey Growers, LLC, Huron, SD (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/255,907

(22) Filed: Oct. 22, 2008

(65) Prior Publication Data

US 2009/0186568 A1 Jul. 23, 2009

Related U.S. Application Data

(63) Continuation of application No. 11/651,250, filed on Jan. 9, 2007, now Pat. No. 7,448,943.

(51) Int. Cl.
*A22B 3/00* (2006.01)

(52) U.S. Cl. .................................................. 452/66

(58) Field of Classification Search ................... 452/66, 452/52, 53, 198
See application file for complete search history.

(56) References Cited

U.S. PATENT DOCUMENTS

| | | | |
|---|---|---|---|
| 4,888,855 A * | 12/1989 | Haumann et al. | 452/53 |
| 5,487,699 A * | 1/1996 | Tyrrell et al. | 452/66 |
| 5,788,564 A * | 8/1998 | Chamberlain | 452/66 |
| 5,906,540 A * | 5/1999 | Grandin | 452/58 |
| 6,126,534 A * | 10/2000 | Jacobs et al. | 452/66 |
| 6,135,872 A * | 10/2000 | Freeland et al. | 452/66 |
| 6,174,228 B1 * | 1/2001 | Grimsland et al. | 452/66 |
| 6,848,987 B2 * | 2/2005 | Draft | 452/66 |
| 7,097,552 B2 * | 8/2006 | Ovesen et al. | 452/66 |

* cited by examiner

*Primary Examiner*—Thomas Price
(74) *Attorney, Agent, or Firm*—Homer W. Faucett, III; Ice Miller LLP

(57) ABSTRACT

A system for stunning poultry located in cages in which the system utilizing an automated control system and a series of stunning apparatuses for progressively increasing exposure of the poultry to a subduing gas. The system is adjustable to allow for varying concentrations of the subduing gas, as well as adjusting the time for which the poultry is exposed to the subduing gas. In addition, the conveyor system includes methods for maintaining the poultry in a calm state prior to dispatch.

33 Claims, 11 Drawing Sheets

POULTRY STUNNING SYSTEM

PRIORITY

This application is a continuation of U.S. patent application Ser. No. 11/651,250, filed Jan. 9, 2007, incorporated by reference herein.

FIELD OF THE INVENTION

The present invention relates to poultry handling systems and more particularly pertains to a new poultry stunning system for rendering poultry senseless in a humane manner and to facilitate preparation of the poultry for processing while minimizing the excitement of the birds, and for emptying the unconscious but live poultry from transport cages.

BACKGROUND

In the poultry processing industry, a number of methods have been devised for stunning (preferably without killing) live poultry prior to processing into various food products. While the previous methods such as electric shock stunning are substantially directed to performing this operation in an efficient manner, there has been a growing trend toward implementing more humane methods of euthanizing the birds, while still preserving the quality of the meat. One approach that has been used is the implementation of carbon dioxide ($CO_2$) and or other gasses to "stun", or reduce the consciousness of, the poultry prior to slaughter. Ideally, carbon dioxide or other stunning gasses should be used in a manner that reduces or eliminates the consciousness of the birds while keeping them alive, as regulations require that poultry be bled out prior to processing.

However, to preserve the quality of the meat, the birds should be kept as calm as possible prior to the euthanization so to preclude excitement, increased heart rate, adrenaline release into the bloodstream, and/or other factors that can cause increased blood flow to the birds' extremities. Should any of the foregoing occur, the quality of the resultant meat is likely to suffer, as it is widely held that unstressed animals produce more palatable meat with a better texture. Further, unstressed animals tend to hold less blood in their extremities, thereby allowing the poultry to bleed out more completely. Thus, the process and apparatus employed to stun and euthanize the poultry should cause as little disturbance as possible to the birds prior to and during the application of the stunning and euthanizing.

Moreover, the stunning process should cause the bird to become unconscious (e.g., by reducing the brain activity of the bird), which minimizes the excitability of the bird, while not stopping or reducing the function of the bird's heart, a situation which can make it difficult to drain most of the blood out of the body of the bird, especially the extremities. Further, the size and health condition of the poultry can greatly affect whether a given amount of exposure time or concentration of carbon dioxide or other gasses either stuns, kills, or merely stresses live poultry.

As noted above, $CO_2$ stunning is one method of incapacitating poultry prior to euthanizing. One example of a known $CO_2$ stunning systems is shown in U.S. Pat. No. 6,848,987 to Draft (hereinafter referred to as "the '987 patent"). While this system relates to using $CO_2$ to stun birds prior to processing, the process used introduces stressors to the birds prior to and during the stunning process, which can lead to an increased heart rate in the birds and the aforementioned problems resulting from the increased heart rate.

For example, in the system of the '987 patent, the cages are subjected to numerous movements that can cause physical jarring of the birds and audible noises about the birds, which can lead to unnecessary excitement of the birds. Specifically, the cages, which are typically transported in stacks of two or more cages, must be unstacked from each other prior to moving through the system and the stunning of the birds. Since the structure of the cages is analogous to a stack of drawers, the unstacking of the cages functions to remove the top or ceiling from the cages, and this change in environment may disorient or excite the birds. In addition, the apparatus of the '987 patent primarily moves the cages in a horizontal direction, yet requires that the cages be lowered or moved downwardly into a gas chamber, a further change in the birds' environment that can cause a disturbance among the birds, and providing an area where $CO_2$, which is heavier than air, may accumulate at levels higher than anticipated. Further, the '987 patent reports that the presence of humidity to a gas chamber utilizing carbon dioxide can lead to the production of carbonic acid, further stressing the poultry.

Further, as discussed above, a method or system for adjusting the levels of $CO_2$ to allow for differing poultry sizes and health conditions of the animals would be greatly appreciated. In addition, since the application of carbon dioxide to the birds tends to dry their throats and cause panic in the birds this side effect should be minimized as much as possible.

Therefore, a system for stunning poultry that reduces the stress to the animals, allows for controlled adjustment of the stunning levels depending upon the particular poultry being used, based upon the type of poultry, their size, and their health, without risking the killing of the poultry or stressing the poultry without properly rendering them unconscious would be greatly appreciated in the art.

SUMMARY

In view of the foregoing disadvantages inherent in the known types of poultry handling systems now present in the prior art, the present invention relates to poultry handling systems and more particularly pertains to a new poultry stunning system for rendering poultry senseless in a humane manner and to facilitate preparation of the poultry for processing while minimizing the excitement of the birds, and for emptying the poultry from transport cages. Further, the present invention provides a method for adjusting the stunning capacity between loads to allow for varying type, size, and health conditions of the animals that are incoming.

To attain this, the present invention generally comprises a system for stunning poultry located in cages. The system comprises a moving apparatus for moving the cages along a path having a beginning and an ending, and a multiple stage stunning apparatus for stunning poultry in the cages while the cages move along the path. The stunning apparatus includes at least two, and preferably three or more stages with each stage subjecting the poultry to a different concentration of a gas in air that progressively increases.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

One significant advantage of the present invention is the capability to stun the birds while still in the cages and without unduly disturbing the birds caused by, for example, removing the birds from the cages, for example, unstacking the cages and raising and lowering the cages between stunning stations while moving the cages. Further, another advantage of the invention is the progressive exposure of the birds to an, increasing, but controlled concentration of the gas that gradually stun the birds in a manner that does not kill the birds but keeps them passive for euthanization. The invention also includes features that reduce potential negative effects of the gas on the birds, such as the dry throat panic reaction.

Further advantages of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects of the invention will become apparent when consideration is given to the following detailed description thereof. Such description makes reference to the annexed drawings wherein.

DESCRIPTION

The present application relates to a system for humanely stunning poultry such as turkeys prior to processing, and particularly to a method that allows high throughput while still allowing for adjustments to be made between loads to preclude the stunning from killing the animals.

I. Overview of the Stunning System

Figure 1:
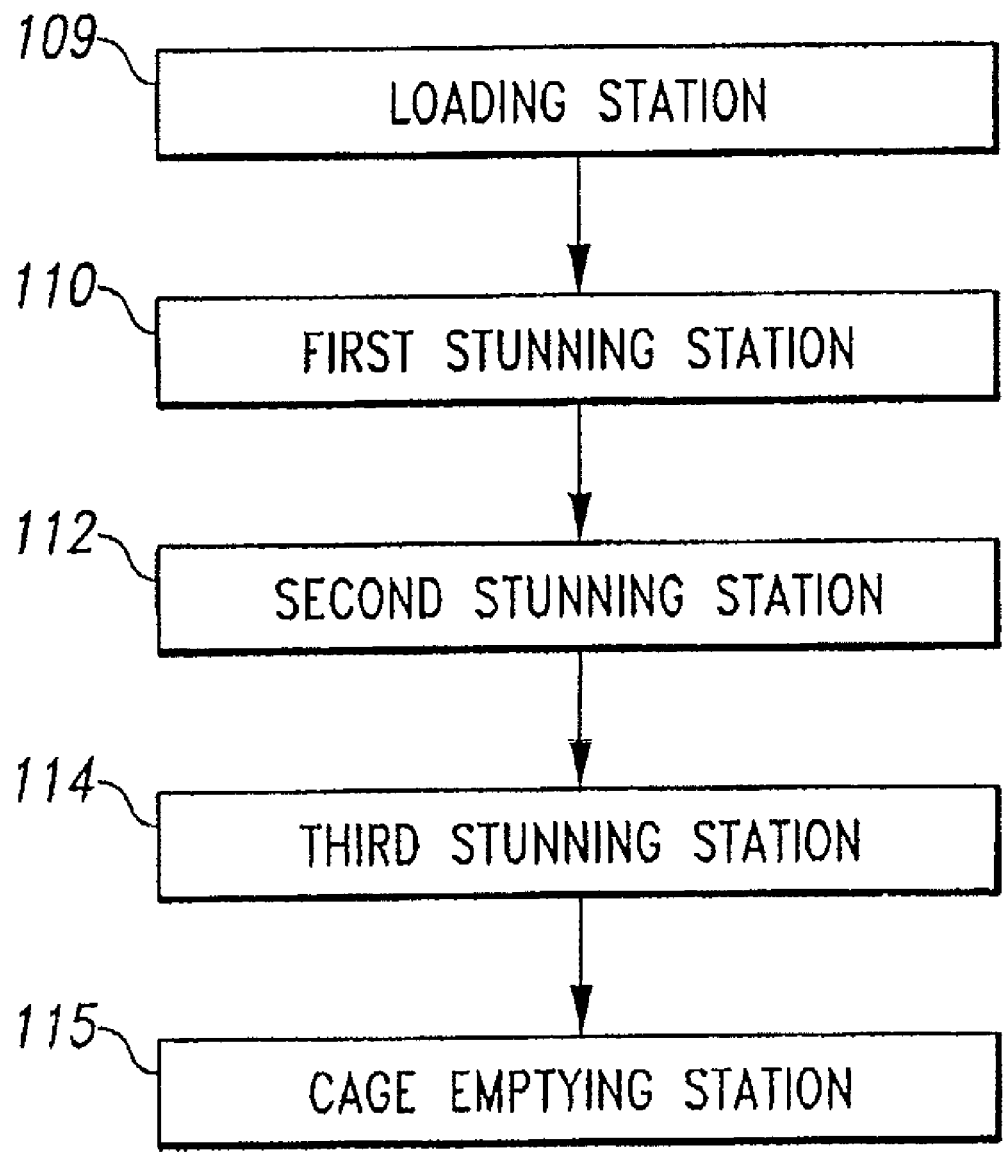
FIG. 1 is a schematic diagram of a new poultry stunning system according to the present invention.
Figure 10:
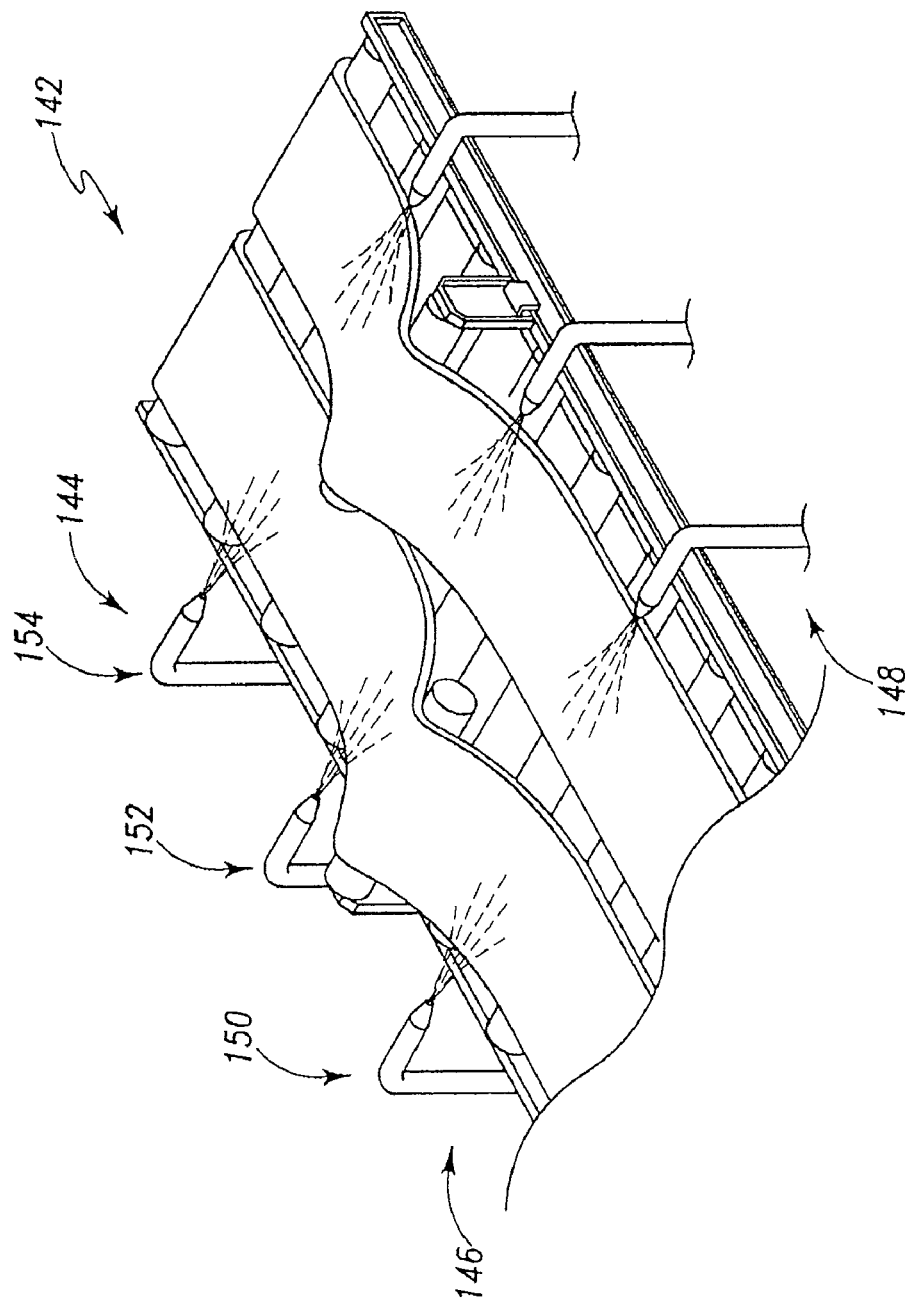
FIG. 10 is a schematic side view of the washing station of the present invention.

According to FIG. 1, a poultry stunning system 10 according to one embodiment of the present invention comprises a series of stations utilized to stun and unload poultry prior to euthanization and processing. In particular, poultry is generally delivered to a processing facility for intake by truck, with the poultry being brought in on large cages 2 (see FIG. 2), described in further detail below. Once the poultry is delivered to the processing facility, with the poultry being delivered in multiple large cages 2 that are stacked on top of one another, and/or cages having multiple tiers, the cages containing the poultry are unloaded from the truck, and placed into poultry stunning system 10 where they will generally progress from conveyor loading station 109, to first stunning station 110. Once cage 2 progresses into first stunning station 3, a specified amount of subduing gas (such as carbon dioxide ($CO_2$)) is released into the chamber. Thereafter, the cage progresses to a second stunning station 112, and then on to third stunning station 114, and finally on to cage emptying station 115 where the stunned poultry is removed from the cage and sent on for further processing. Optionally, as shown in FIG. 10, a final cage washing station 142 may be placed after the cage emptying station to allow for automatic cleaning of the cage and return of the cage to the truck. It will be appreciated that the system may keep a cage in constant motion from the time the cage reaches conveyor loading station to the time it progresses through cage washing station 142. However, according to one embodiment of the present application, poultry stunning system 10 causes a cage to stop at each stunning station for a specified period of time as further discussed below.

Figure 2:
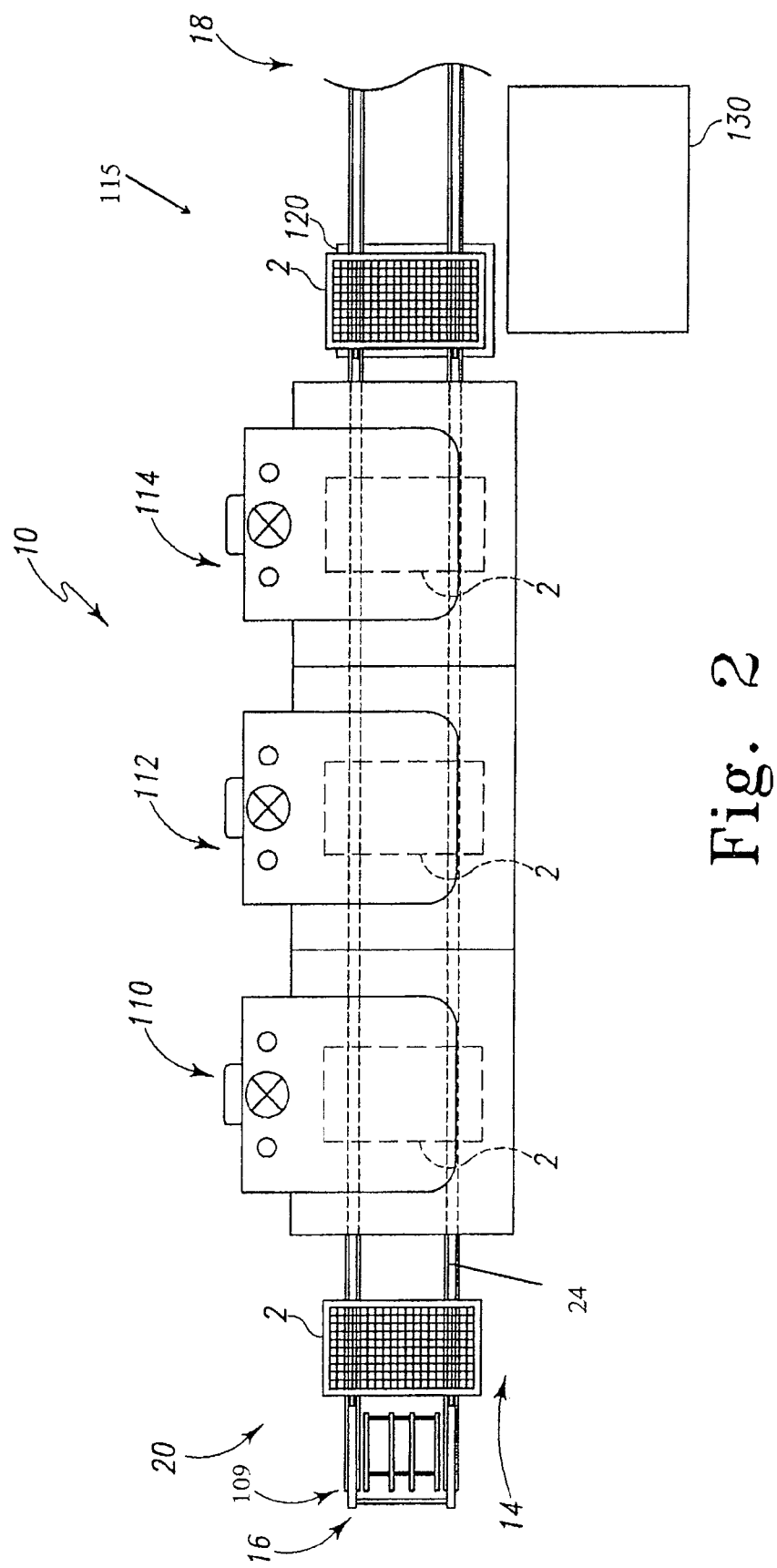
FIG. 2 is a schematic top view of one embodiment of a poultry stunning system according to the present invention.

As will be appreciated, according to one embodiment of the present invention shown in FIG. 2, poultry stunning system 10 is preferably automated through the use of a conveyor system 20, which allows a cage 2 to be loaded at loading station 109, and then to be automatically conveyed through the remaining stations by an operator or computerized system which controls the timing at each station and allows for higher throughput with decreased stress in the poultry. It will be appreciated that system 10 as shown in FIG. 2 is utilized to bring in live poultry, and thereafter routing the live poultry through system 10 to stun or lowering the consciousness level of live poultry, such as turkeys, to facilitate the handling of the poultry without placing undue stress on the birds. Thus, the stunning system 10 through its automated process of lowering the consciousness level of live poultry without removing them from cages reduces injury of the birds, and thus makes the handling of the birds easier to perform, even in handling high volumes of poultry. System 10 is thus highly suitable for use in the emptying of unconscious poultry from portable cages 2 that are used for transporting the poultry in a live condition between locations, such as between the facility in which the birds are raised and the facility at which the birds are processed into different food products.

In the illustrative embodiment shown in FIG. 2-5, the cages 2 that hold the birds are generally constructed of rectangular metal frame members with elongate confining elements (such as wire) disposed between the frame members that permits the free flow of air into and out of the interior of the cages while confining the birds within the cages. Preferably, but not necessarily, more than one of the cages may be vertically stacked together to form a plurality of tiers, each containing the birds to be processed, and be moved along the path 14 in a stacked set. Illustratively, three of the cages may be included in a set that is positioned in a stack on the conveyor in the same location. Advantageously, the cages are often transported on vehicles in vertical stacks of three, so the stacked configuration of the cages for movement in the system 10 does not have to be changed from the configuration of the cages in the previous transportation mode, thus lessening the disturbance the birds during movement from the transport vehicle to the system of the invention.

It will be appreciated that according to one embodiment of the present application, cages 2 may be designed such that a single cage 2 comprises what would normally be two or three cages, such that a single cage 2 comprises a single unitary cage that is a multiple tiered cage such as the three tiered cages. One example of cages that are suitable for use with the invention have three levels, with each level having a size of approximately four feet wide by approximately four to eight feet long by approximately 17 inches high, an cages utilizing three tiers (also termed "batteries") may hold approximately 48 to 57 turkeys of about 38-42 pounds each. While use of multiple level cages has been generally avoided due to the difficulty in delivering similar concentrations of subduing gas to each level of such cages, the present stunning system 10 utilizes certain features that overcome these issues and thereby increases the throughput and productivity of stunning system 10 over previous systems.

It will be understood that the invention is not limited to usage with cages with the dimensions set forth above, and thus cages of other sizes or other multiple levels may be employed. Those of ordinary skill in the art will appreciate that the present system can be adapted to smaller sizes of poultry, and the present system is readily adaptable to embodiments in other animals, including beef and pork. For example, in an alternate embodiment, chicken cages having 5-6 tiers may be utilized, with each tier measuring about 4 feet by 4 feet by 17-18 inches. Such a set of cages (also known as a "battery") typically holds approximately 90-120 chickens at 3-7 pounds per chicken.

In the illustrative embodiment, it is useful to orient the cages 2 so that the length dimension of the cages extends transverse to the longitudinal direction of movement of the cages through the system 10, and the width dimension of the cages extends substantially parallel to the longitudinal direction of movement, but several other orientations can be used.

According to FIG. 2, stunning system 10 of the invention utilizes a conveyor 20 to move cages 2 along a path 14. Path 14 has a beginning portion 16 and an ending portion 18, but the length of beginning portion 16 and ending portion 18 can be adjusted to allow for additional stations such as cage washing station 142 shown in FIG. 10 but not shown in the illustrative embodiment of FIG. 2. The path 14 may be linear or straight, or may be non-linear in character. The stunning system 10 may include a number of stunning stations located along the path 14 between the beginning portion 16 and the ending portion 18 of the path, preferably at least 2, and more preferably at least 3 stunning stations located in close proximity or adjoining one another. Additionally, other stations such as loading station 109 or emptying station 115 may be used as well.

II. The Conveyor System

Figure 3:
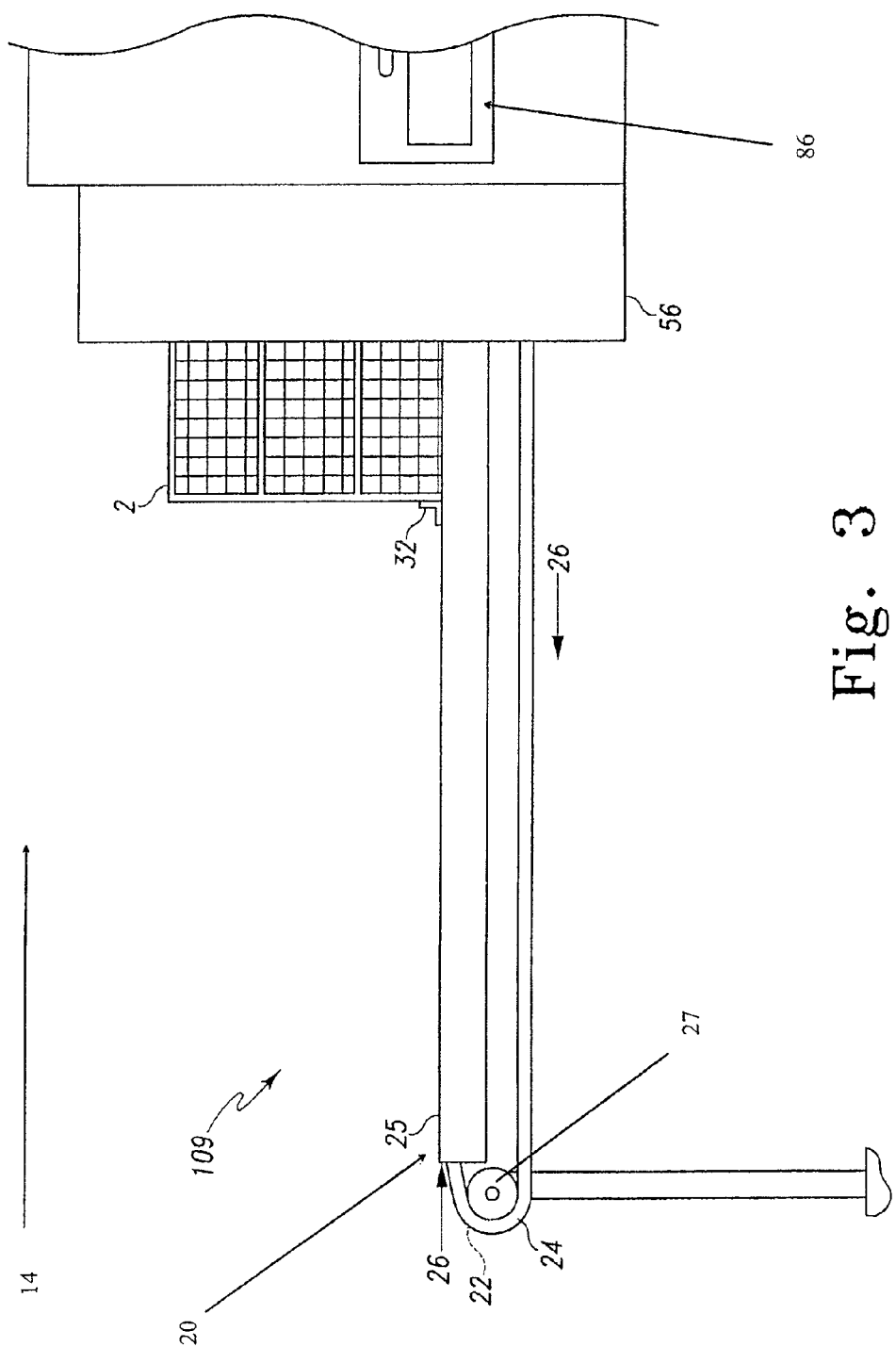
FIG. 3 is a schematic side view of a cage loading station of the present invention.

As discussed above, stunning system 10 may utilize a conveyor system 20 for automatically moving cages 2 from the beginning portion 16 to the ending portion 18 of path 14. As shown in FIGS. 2 and 3, the system 10 may comprise a conveyor system 20 for moving the cages along path 14, and conveyor system 20 may extend between beginning portion 16 and ending portion 18. Conveyor system 20 has an upper support plane 22 on which the cages are supported as the cages are moved by a conveyor element 24 along path 14. In certain preferred embodiments of the invention, conveyor system 20 is relatively porous or open to gas flow to permit air and other gases to relatively freely pass through the upper support plane of the conveyor. Preferably, the vertical height of the conveyor 20 does not rise or lower significantly while it moves between the stunning stations, and thus cages moving along the conveyor do not make sudden or significant vertical movements that disturb the birds in the cages 2.

Turning now to FIG. 3, conveyor system 20 may comprise one or more of conveyor elements 24 that extend in the direction from the beginning and ending of conveyor system 20. Conveyor elements 24 may comprise a chain, chain links, belts, or other components used to urge an element forward on a given path. In addition, conveyor elements 24 may comprise a pick-up bar 32 located on conveyor element 24 and operable to engage the back of a cage 2 to urge cages 2 in a forward position as conveyor system 20 operates along path 14. Optionally, conveyor elements 24 may be laterally spaced from each other to create gaps between the elements 24 through which air and gases can move. Conveyor elements 24 are movable in a longitudinal direction 26 of the conveyor system 20, so that cages 2 rested on or urged by conveyor elements 24 are moved in the longitudinal direction of conveyor system 20. In one embodiment, as shown in FIG. 2, the conveyor system 20 includes two conveyor elements 24, with one element on a first lateral side of the conveyor system 20, another conveyor element 24 on a second lateral side of the conveyor system 20. Optionally, additional conveyor elements 24 may be used, as well as a guide fin 25 to help keep cages 2 on conveyor system 20. Conveyor system 20 may be continuous between the beginning portion 16 and ending 18 of the path 14, but may also include a plurality of longitudinally-extending conveyor segments extending along different longitudinal sections of the path.

According to one exemplary embodiment, conveyor elements 24 of conveyor 20 may move in a substantially continuous manner by operation of motor driven conveyor that engages with conveyor elements 24 by drive wheel 27, or other means known in the art. However, conveyor elements 24 may move in a series of discrete, discontinuous movements, as cages 2 are moved through each station and the movement of the conveyor is paused to hold the cages in each station for a specified period of time.

As discussed above, and shown in FIG. 3, each longitudinally-extending conveyor element 24 of conveyor system 20 optionally comprises a belt or a chain made up of smaller links that is moved in a longitudinal direction of the conveyor along the path 14. Conveyor elements 24 are thus flexible for forming contours in the path of the conveyor in the vertical direction. Conveyor system 20 may also comprise a pick up bar 32 mounted on the chain for engaging the bottom portions of cages 2 resting on the upper support plane 22 of the conveyor 20. A pick-up bar 32 may be mounted on each of the chains at longitudinally-equivalent locations on the conveyor 20, so that the pick-up bars of each of the chains are laterally abreast of each other as the chains are moved along the path. A plurality of the pick-up bars 32 may also be mounted on each of the chains at longitudinally-separated locations along the chain so that a number of the cages 2 may be simultaneously moved along by the conveyor at different longitudinal locations on the path 14. For example, the pick up bars 32 may be spaced approximately six feet from each other along the chains to achieve a desired spacing between the approximately 4 foot wide cages of approximately 2 feet. Other spacings for other sizes of cages may be employed, and pick up bar 32 may comprise any raised surface on conveyor elements 24 operable to contact the back of cages 2.

III. Loading a Stunning System

At the beginning 16 of the path 14, the stunning system 10 may include a means for loading the cages onto the conveyor system 20 for movement along the path 14. As shown in FIGS. 2 and 3, loading station 109 may thus be located at the beginning 16 of the path to permit cages 2 to be placed on the conveyor 20 in a manner that can accurately position the cages on the conveyor while also minimizing the disturbance to the birds in the cages. The loading station 109 may include a platform for resting the cages 2 upon, or a cage may be simply placed upon conveyor system 20. Alternately, a fork truck may be used to load the cages onto the loading station. Once the conveyor 20 advances such that the cage moves along the path 14 and is no longer located above the loading platform, another cage may be placed on the platform.

IV. The Stunning Apparatus

A. General Progression Through the Apparatuses

Figure 4:
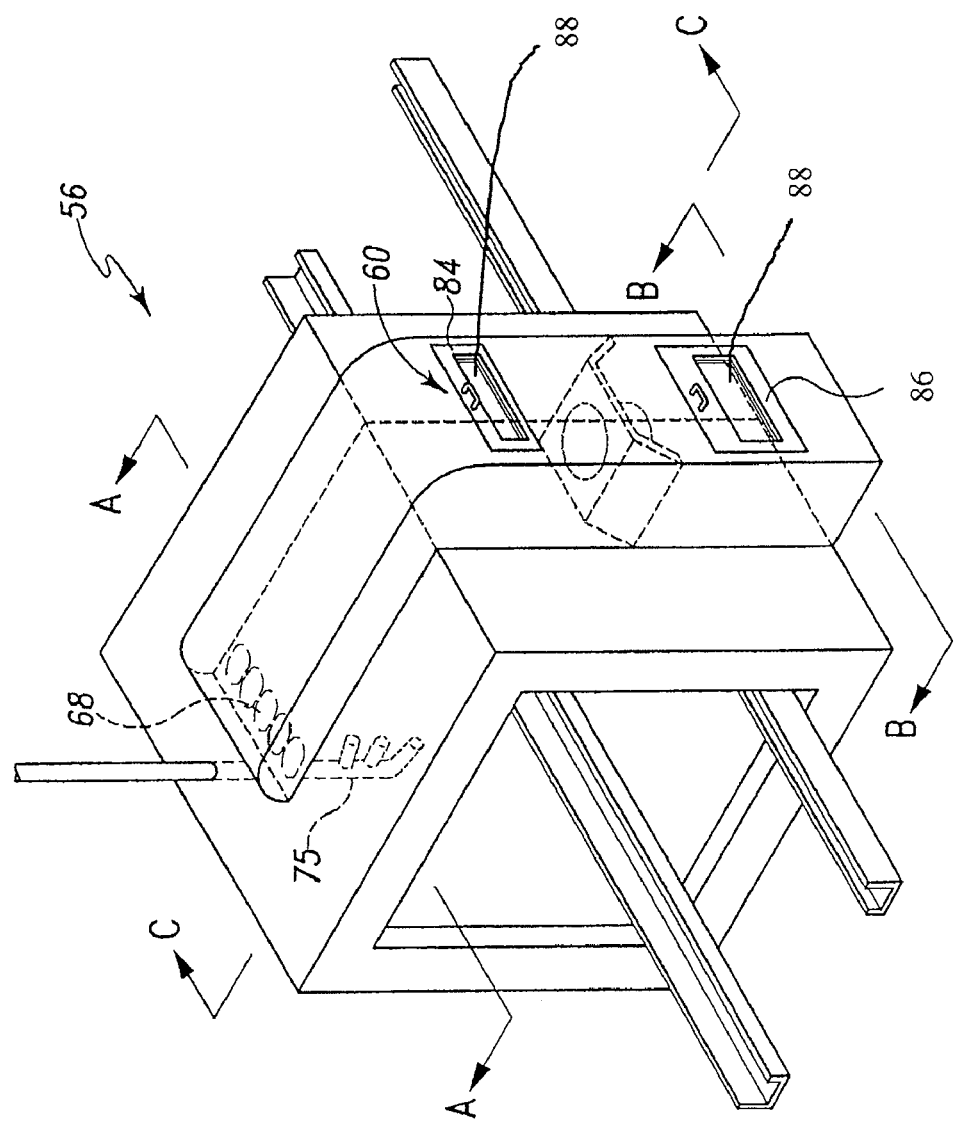
FIG. 4 is a schematic perspective view of one of the stations of the stunning apparatus of the present invention.
Figure 5:
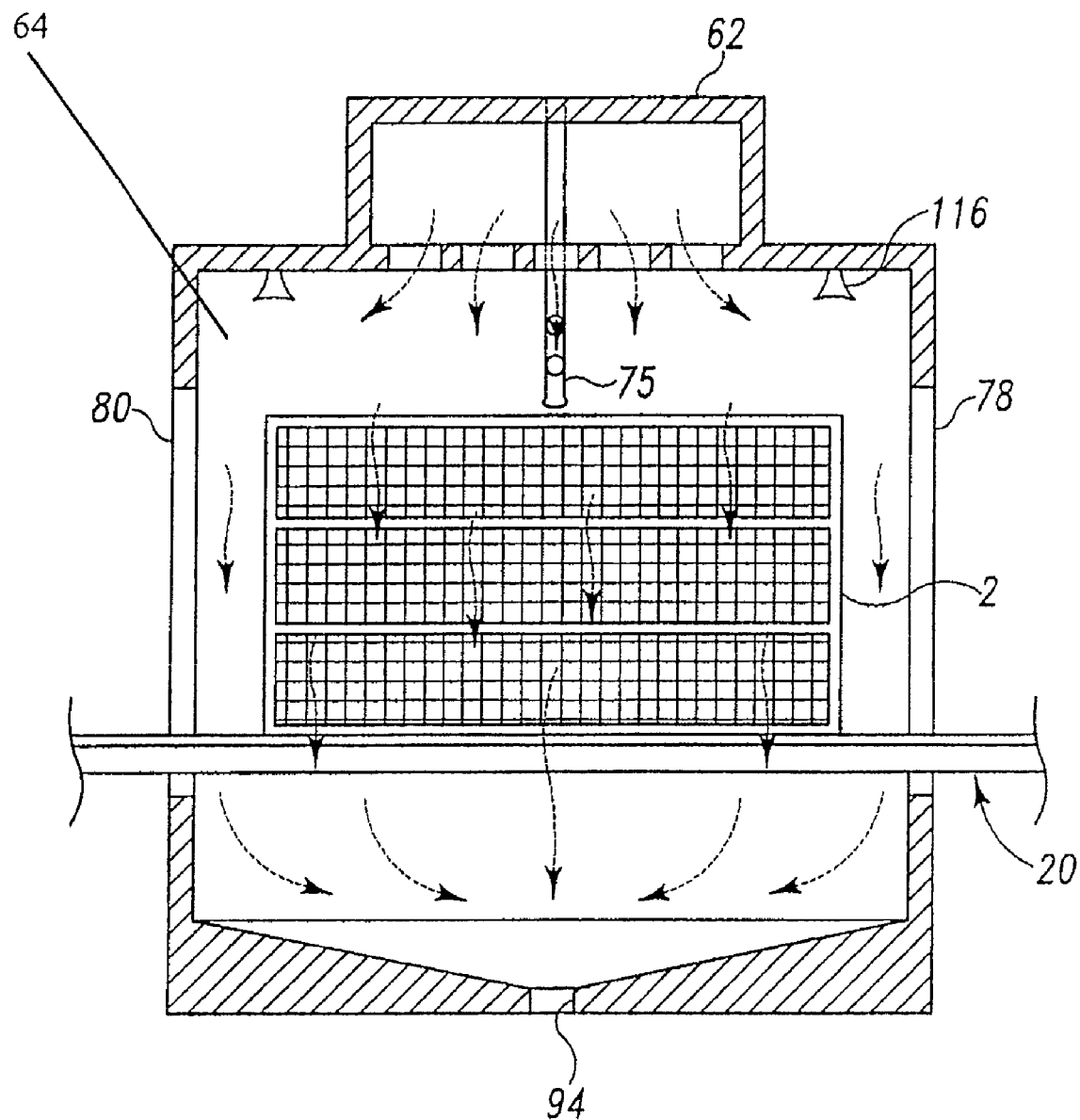
FIG. 5 is a schematic sectional view of one of the stunning stations of the present invention taken along line A-A of FIG. 4.
Figure 6:
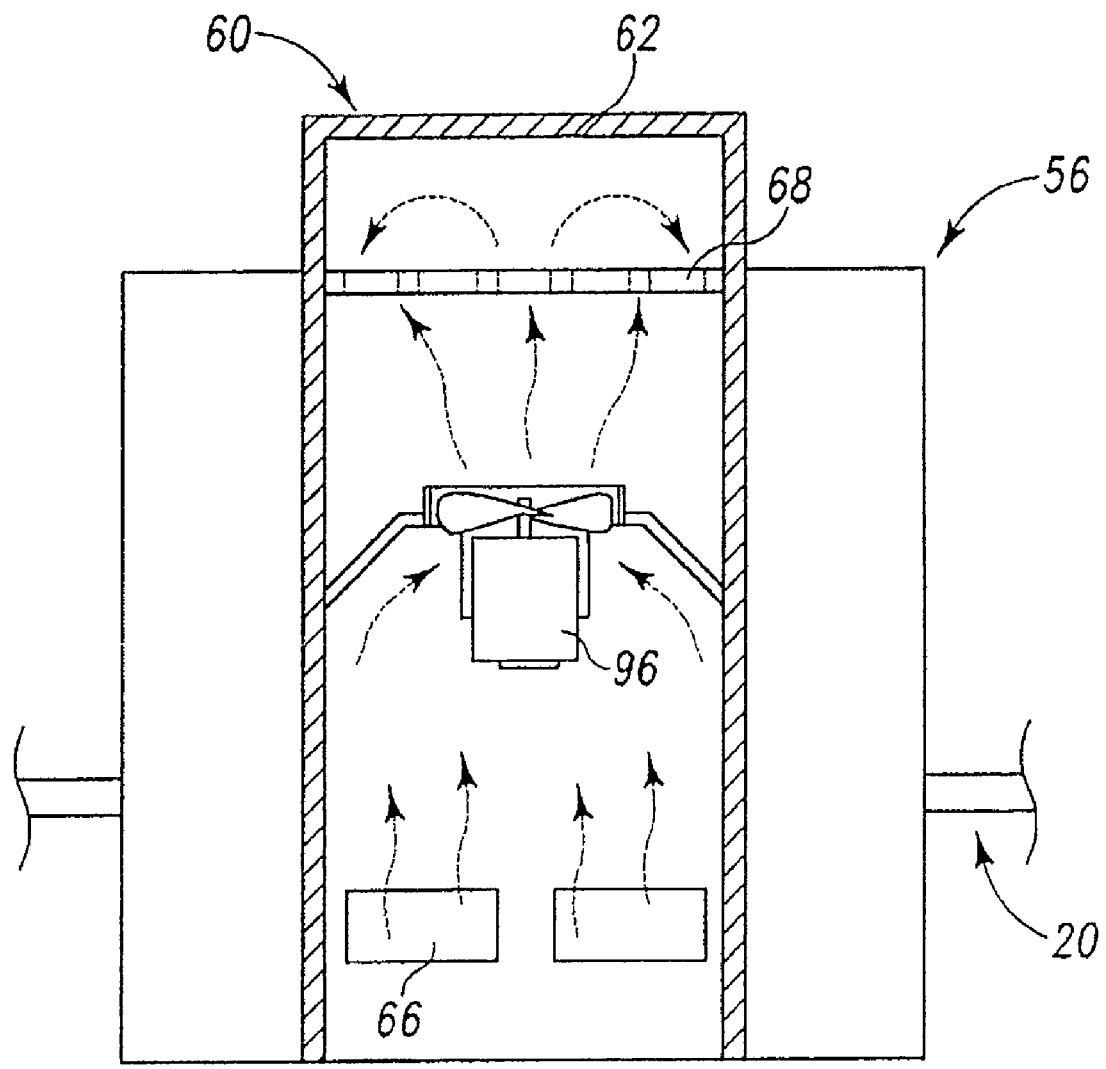
FIG. 6 is a schematic sectional view of one of the stunning stations of the present invention taken along line B-B of FIG. 4.

Once cages 2 are loaded onto conveyor system 20, the cages are advanced along the stations discussed in FIG. 1, and progress through system 10 as shown in FIG. 2. Each multi-stacked or tiered set of cages is advanced through multiple stunning stations (illustratively shown as three stunning stations 110, 112, and 114) as shown in FIG. 2, allowing for progressive stunning to occur in an efficient manner. Turning now to FIGS. 4-6, each stunning station comprises an apparatus 56 for stunning or reducing the consciousness level of the birds in the cages 2 as the cages move along the path 14 on the conveyor system 20. Significantly, the stunning apparatus 56 does not require that the birds be removed from the cages 2, or that the cages be removed from the conveyor 20, in order to stun the birds.

Figure 7:
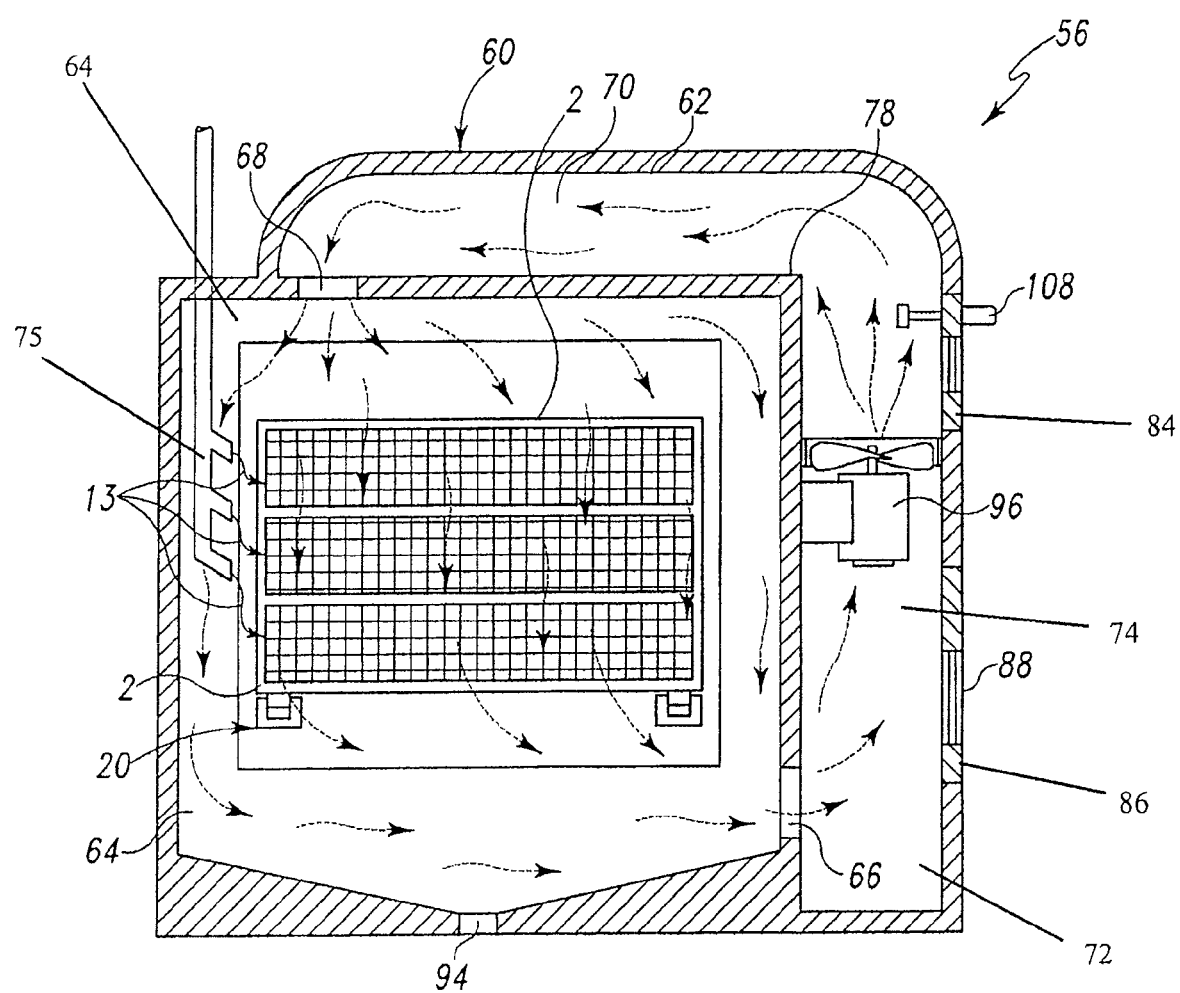
FIG. 7 is a schematic sectional view of one of the stunning stations of the present invention taken along line C-C of FIG. 4.

Turning now to FIGS. 5 and 7, each stunning apparatus 56 employs a subduing or stunning gas 13 introduced to chamber 64 via gas port 75 (see FIGS. 5 and 7) to lower the consciousness of the birds, said stunning gas 13 being introduced into chamber 64 and circulated through stunning apparatus 56 approximately as shown by the dashed lines in FIGS. 5-7. Stunning apparatus 56 operates by creating a relatively higher concentration of stunning gas 13 within chamber 64 relative to outside air, causing the birds to breathe air mixed with the stunning gas 13. In an exemplary embodiment, the stunning gas 13 is carbon dioxide, but optionally another gas having a similar consciousness-lowering effect on poultry may be used. For example, argon, nitrogen, and other relatively inert gasses may be utilized. Further, the stunning apparatus 56 preferably exposes the birds to progressively greater concentrations of the gas, in at least two, and preferably three stages, to minimize the distress of the birds, decrease the possibility of accidentally killing the birds during the stunning process, and to increase the throughput of the stunning system to allow for greater productivity. In the illustrative embodiment of the invention described herein, three stages with three different concentrations are employed as discussed in further detail below, but it will be appreciated that the invention may be implemented using a different number of stages with different stunning gas concentrations and/or exposure times. Alternately multiple cages may be included in each stunning apparatus 56 and spaced laterally along conveyor 20 by increasing the size of chamber 64 and conveyor 20 without substantially increasing the stunning gas concentration or stun times while thereby increasing size of chamber 56 and conveyor system 20.

According to the exemplary embodiment in FIG. 2, each stage, or station, of the stunning system 10 comprises a stunning apparatus 56 that is optionally similar to the other stunning apparatuses 56, and each stunning station is positioned along path 14. Preferably, the first stunning station 110 receives first cages 2, and vertically moveable doors on the first stunning station 110 (not shown) descend downwardly and close to form a reasonable gas seal (see FIGS. 4 and 5) such that the subduing gas 13 can be released into the chamber 64 and maintained at a desired first concentration. Conveying system 20 stops, allowing the first cages 2 to remain in the first stunning station 110. Subduing gas 13 is released into stunning station 110 until a first desired concentration of subduing gas is reached, and the poultry is exposed to the first desired concentration of subduing gas for a selected period of time. Thereafter, the doors on the first stunning apparatus 56 are opened, and conveying system 20 urges the first cages 2 into the second stunning station 112 and optionally urges a second cages 2 into the first stunning station 112.

When first cages 2 are urged into second stunning apparatus 56, the doors on the second stunning station 112 close and conveying system 20 stops, allowing the first cages 2 to remain in the second stunning station 112. Subduing gas 13 of the same and/or different type is then released into the second stunning station 112 at a second desired concentration, and the poultry is allowed to remain therein for a selected period of time. Preferably, second cages 2 are subjected to first stage stunning at first station 110 while first set of cages 2 are undergoing second stunning in second station 112. Optionally, fine droplets of water are dispersed within the second stunning station 112 to preclude the poultry from having a dry throat reaction, and causing them to remain calm. Thereafter, the doors on the second stunning apparatus 56 are opened, and conveying system 20 urges the first cages 2 into the third stunning station 114 and optionally urges the second cages 2 into the second stunning station 112 and a third cages 2 into the first stunning station 110.

When first cages 2 are urged into third stunning station 114, the doors on the third stunning station 114 close and conveying system 20 stops, allowing the first cages 2 to remain in the third stunning station 114. Subduing gas 13 of the same and/or different type is then released into the third stunning station 114 at a third desired concentration, and the poultry is allowed to remain therein for a selected period of time. Preferably, second and third cages 2 are subjected to second and first stunning at stunning stations 112 and 110, respectively, while first cages 2 are undergoing third stunning at third station 114. In a preferred embodiment, the first selected concentration of the subduing gas 13 is lower than the second selected concentration of the subduing gas, which is in turn lower than the third selected concentration of the subduing gas. Further, any additional stations that are optionally arranged along the path are calibrated such that the birds in the cages are exposed to progressively greater concentrations of subduing gas 13 as they progress through the line.

B. Discussion of Details of Exemplary Embodiments of a Stunning Apparatus

Turning now to FIGS. 4-7, each of the stunning apparatuses 56 optionally comprise an apparatus 60 for mixing air and the subduing gas 13 and circulating the mixture through the cages as the cages move along the path 14 on the conveyor 20, thereby infusing the air/gas mixture inside and about the cages 2 with a desired level of the subduing gas 13. The mixing apparatus 60 offers advantages over the prior art, as it will be appreciated that injection of pure carbon dioxide will cause high concentrations of $CO_2$ to be present in certain areas of a stunning chamber while other areas remain at low levels of $CO_2$, particularly because $CO_2$ is heavier than air. Because this "puddling effect" can cause some birds to be exposed to varying concentrations of $CO_2$, some birds may be killed while others remain relatively unaffected. Such a system results in varying quality of resultant meat. Thus, apparatus 60 for mixing air and the subduing gas 13 is utilized in certain preferred embodiments of the present application.

As shown in FIG. 4-7, apparatus 60 for mixing air and the subduing gas 13 comprises a plenum structure 62 for adding the gas to the ambient air, producing a flow of the mixture of air and the gas, and guiding the flow of the mixture through the cages and in on path 14 while located within chamber 64. The plenum 62 may extend about a portion or section of the conveyor 20, and in some embodiments the plenum 62 encircles the conveyor, to achieve the desired infusion of the gas and air mixture into the cages. Turning now to FIGS. 5-7, stunning station 56 has an interior 64 that defines a chamber, and includes an inlet 66 and an outlet 68 that extends into the chamber 64. The inlet 66 may be positioned below the path 14, for intaking air from below the path, and the outlet 68 may be positioned above the path for outputting air above the path. The path 14 is positioned between the inlet 66 and the outlet 68 to create a flow of the gas and air across the path and through the conveyor 20.

The plenum structure 62 thus has an outlet portion 70 positioned above the path 14 for handling the flow of the gas and air mixture as it exits the plenum, and an inlet portion 72 positioned below the path for handling the flow of the gas and air mixture entering the plenum. Plenum 62 is preferably supported by the side and top walls of chamber 64. The end walls of chamber 64 define an entry opening 78 and an exit opening 80 through which conveyor 20 may move cages 2 into and out of chamber 64 when the doors are in the open position.

Further according to FIGS. 5 and 7, at least one, and preferably three stunning gas ports 75 are optionally present within the chamber, and are situated to direct stunning gas 13 at each of the three levels of multi-tiered cages 2 while apparatus 60 continues to mix the air and subduing gas 13 while gas 13 is being injected into chamber 64. If carbon dioxide is used as a stunning or subduing gas 13, carbon dioxide may be supplied by a modular carbon dioxide pressure build vaporizer such as those supplied by Carbo Tech, Inc. of Monroe, Ga.

Oxygen or other gas sensors 108 (see FIG. 7) are optionally utilized to monitor concentrations of the subduing gas 13 within each stunning apparatus 56. Use of oxygen sensors allows an operator to monitor the volume of oxygen being displaced by the volume of added or infused subduing gas or gasses. One can extrapolate the volume/concentration of the subduing gas from this oxygen measurement. For example, according to an illustrative embodiment of the present application, a first chamber 110 may be infused with sufficient stunning gas to ensure that the oxygen sensor within stunning station 110 reads between about 18-20% oxygen during the stunning portion of the cycle; a second chamber 112 may be infused with sufficient stunning gas to ensure that the oxygen sensor within stunning station 112 reads between about 12-14% oxygen during the stunning portion of the cycle; and third station 114 may be infused with sufficient stunning gas such that the oxygen sensor with in third stunning station 114 reads between about 3-4% oxygen.

It will be appreciated that stunning poultry of differing sizes will generally require the same concentration, by percent volume, of stunning gas for similar total masses of poultry. However, it will be appreciated by those in the art that different amounts of stunning gas will need to be added to the chamber to effect and sustain those concentrations.

According to one embodiment of the present invention, a heating mechanism is optionally used to heat subduing gas 13 prior to injection into the stunning apparatus. It will be appreciated that use of a heating mechanism allows for better mixture of the subduing gas 13 to a desired temperature, typically the ambient air temperature within chamber 64 of the stunning apparatus 56, thereby allowing for a more homogenous mixture. In addition, having the stunning gas 13 heated just prior to injection prevents uncontrolled expansion of the subduing gas 13 after injection into the stunning apparatus 56, which can cause inadvertent overdosing of the poultry. In addition, less total volume of subduing gas 13 need be used when the subduing gas is pre-heated. It will be appreciated that several different heating apparatuses can be used to heat the subduing gas 13 prior to injection, including a steam heater capable of heating and expanding the carbon dioxide just prior to injection.

As will be appreciated, maintaining a particular concentration of subduing gas 13 within the stunning apparatus 56 can be more efficiently accomplished when openings to the stunning apparatus 56 maintain a method for precluding the gas from escaping. The entry 78 and exit 80 openings of the stunning apparatus may be obstructed in some manner to reduce or block the escape of the gas/air mixture. In one embodiment of the invention, an air curtain generating apparatus may be employed to create a curtain of air moving across each of the entry and the exit of the chamber to facilitate the retention of the gas and air mixture in the interior. It has been found that use of a movable door, such as an overhead door with a seal material on its lower descending edge portion, is generally more effective in maintaining the subduing gas concentration within the stunning apparatus.

As shown in FIGS. 4 and 7, the stunning apparatus 56, including chamber 64 and plenum 62 may include various access doors, such as an upper access door 84 and a lower access door 86 in the intermediate portion 74, for allowing access to various portions of the interior 64 of the stunning apparatus 56. The access doors may also be provided with transparent windows 88 to permit visual observation of the interior of the plenum, and thereby allowing an operator to observe the poultry during the stunning so that subduing gas 13 concentrations can be adjusted if the desired effect is not occurring. The plenum 62 may also have air inlet openings that permit fresh, filtered air to be added to the flow of the gas/air mixture moving through the interior of the plenum during evacuation of the air/gas mixture. The stunning apparatus 56 may also include a drain 94 to permit fluids to exit the plenum when the chamber 64 is cleaned.

As shown in FIGS. 6 and 7, mixing apparatus 60 may also include an air flow apparatus 96 for causing or inducing the flow of the gas and air through the chamber 64 and the plenum 62. The air flow apparatus 60 may be mounted on the plenum 62, and may be located in the chamber 64 of the plenum. The air flow apparatus 96 may be located in an intermediate portion of the plenum 62. The air flow apparatus 96 may comprise at least one fan that is positioned in the interior of the plenum for moving the gas and air mixture through the chamber 64, out of the outlet 68 and into the inlet 66. Optionally, additional fans may be included. The air flow apparatus may include a wall or other barrier positioned in the interior of the plenum that blocks any movement of the gas and air mixture except through the fans.

As shown in FIGS. 5 and 7, the stunning chamber also comprises a gas port 75 for injecting stunning gas into the chamber. The gas port 75 may be positioned in chamber 64, and may be positioned between the inlet 66 of the plenum and the air flow apparatus 96. It will be recognized that the gas injector of port 75 is not limited to a single injector, and may include a plurality of gas injectors. Optionally, a gas port 75 is mounted in the top of chamber 64 and positioned with three separate injector nozzles to direct the subduing gas at each of the three tiers of cages 2 as shown in FIG. 7.

The stunning apparatus 56 may also include a gas sensor 108 for detecting a concentration of the subduing gas 13 in the flow of air and gas. The gas sensor 108 is positioned in the interior of the plenum 62, and the gas sensor may be positioned between the outlet 68 of the plenum and the air flow apparatus 96. Optionally, other sensors may also be provided for measuring various other characteristics of the flow through the plenum or inside chamber 64, such as the concentration of oxygen (as $O_2$) in the mixture flow, and may be located within chamber 64.

Turning now to FIG. 2, in the illustrative system utilizing three stunning apparatuses 56 as three separate stations (labeled 110, 112, and 114 for clarity), the first station 110 of the system 10 produces a concentration of the gas in the total atmosphere between approximately 8 percent and approximately 19 percent concentration of carbon dioxide or other subduing gas 13 by volume. This level of carbon dioxide concentration in the gas/air mixture is effective to make the birds feel slightly tired, while the birds are being initially exposed to the flow of the gas/air mixture through the cages and the interior of the chamber of the stations.

Optionally, it has been found that the first and/or second stunning stations may include means for increasing the humidity in the interior of the stunning station 56 that functions to counteract any tendency of the increased carbon dioxide concentration to dry out the throats of the birds and cause discomfort to the birds discomfort which could lead to panic and distress. The increase in humidity may be accomplished by positioning a water spray assembly in the interior of the plenum 62 of the first station to create a light mist in the air. In one embodiment shown in FIG. 5, the humidity level is increased by one or more misting nozzles 116 that spray water or other humidity raising liquid into the gas/air mixture circulating through the first station 110. The misting nozzles 116 may be located in the chamber, or in the air path outside of the chamber. Optionally, the misting nozzles may be located in other stations of system 10. For example, injection of a pint of water into an approximately 5 foot by 5 foot by 10 foot chamber has been shown to be effective in reducing the dry throat panic reaction, with it being understood that the relative amounts of water can be adjusted in view of the relative humidity of the air.

The second station 112 of the system produces a concentration between approximately 34 percent and approximately 43 percent concentration of subduing gas by volume. This level of carbon dioxide concentration in the gas/air mixture is effective to make the birds lie down or sit down, with their heads still up, but with the birds on the edge of unconsciousness:

The third and final station 114 of the system produces a concentration between approximately 81 percent and 89 percent of subduing gas by volume. This level of carbon dioxide concentration in the gas/air mixture cause the brain of the birds to be inactive, but still allows the heart to continue pumping blood.

The period of time that the cages, and the birds in the cages, are exposed to the particular concentration of the gas may vary, and may be up to ten minutes or more to achieve the full effect of the raised gas concentration on the birds. Preferably, the time of exposure subduing gas is of a much shorter duration (i.e., approximately 30-70 seconds). This time of exposure may be achieved by stopping the movement of the conveyor 20 for the appropriate time period to keep the cages 2 in the respective station of the system, keeping the cages 2 in the respective station of a system between the inlet 78 and outlet 80 of the chamber 64 of the station. In some preferred embodiments of the invention, the conveyor 20 operates on a series of equal time length cycles that includes the time that the conveyor is moving and time that the conveyor is stationary between the movements. In the illustrative three stage embodiment invention for turkeys of about 38-42 pounds each, each cycle lasts for approximately 73 to 82 seconds, with the conveyor moving for approximately 28-30 seconds, and remaining substantially stationary for approximately 45-52 seconds-during which time stunning gas is introduced and stunning occurs. It will be apparent that the cycle times could be longer or shorter, and may be unequal in length of time. For example, in an illustrative two stage stunner, a time of 54 to 66 seconds could be used during the stunning portion of the cycle, with concentrations of stunning gas remaining similar to the second and third stations used in the three stage system example. However, concentrations of the gas must be adjusted to allow for the accumulated effect of the gas for differing time periods. It has been observed that using the stunning method and apparatus as described herein results in significantly improved meat quality, including less blood spotting and reduced ruptured blood vessels and wing breakage.

It will be appreciated that the use of stunning apparatuses 56 that are elevated above the floor of the processing facility, and those that utilize an air mixing plenum 62 provide a means for precluding carbon dioxide from accumulating within the bottom of the stunning apparatus 56 to a level that is detrimental to the poultry.

In one embodiment of the invention, each of the stations 110, 112, 114 is configured to hold one set of 3 tiered cages 2 described above on the conveyor at a time, so that the birds are exposed to the environments in the plenums of each of the stations for approximately equal time periods. Optionally, but less preferably, one or more of the stations may accept more than one set of cages on the conveyor, and in one embodiment, the first and second stations hold one set of cages each and the third station holds two sets of cages.

The chambers of stations 110, 112, 114 may be positioned closely adjacent to each other, even close enough that there is no appreciable gap or space between the stations, but the stations may be spaced or separated from each other along that path. When the stations are positioned closely adjacent to each other, the entries and exits of the respective stations may be aligned with each other, and optionally, a sealing structure may be used to surround and connect opening 78 and 80 of adjacent stations to effect a substantial gas sealed passage between the stations. Optionally, the second station 112 may be equipped with an evacuation apparatus (not shown) that is capable of quickly evacuating or pulling the gas and air mixture from the plenums and/or the chambers of the stations. The evacuation apparatus pulls the gas and air mixture out of the interior of the second station 112, which in turn pulls the gas and air mixture present in each of first 110 and third 114 stations into the interior of the second station. In turn, air is drawn into the entry opening 76 and exit 80 of the first station 110 and the exit opening of the third station 114, thus flushing the gas and air mixture from the chambers and replacing it with environmental air. The removal of the residual gas by an evacuation apparatus from the plenums of the stations 110, 112, 114 permits personnel to access the interiors of the plenums without exposure to the increased concentrations of the gas. Also, the quick removal of the gas and air mixture from the plenums of the stations can increase the likelihood that the birds located in the stations when the movement of the conveyor is stopped can be removed from the influence of the gas, thus increasing the likelihood that the poultry will not be killed by overexposure to the gas and thus may be preserved alive.

C. The Control System

In order to automate and control the stunning system 10 as well as the gas concentrations, according to one embodiment of the present application, a control system 200 allows an operator to adjust the subduing gas 13 concentrations within each stunning apparatus 56, as well as control the speed of conveyor system 20, the opening and closing of the chamber doors, and monitoring the atmosphere within each chamber 64.

Figure 11:
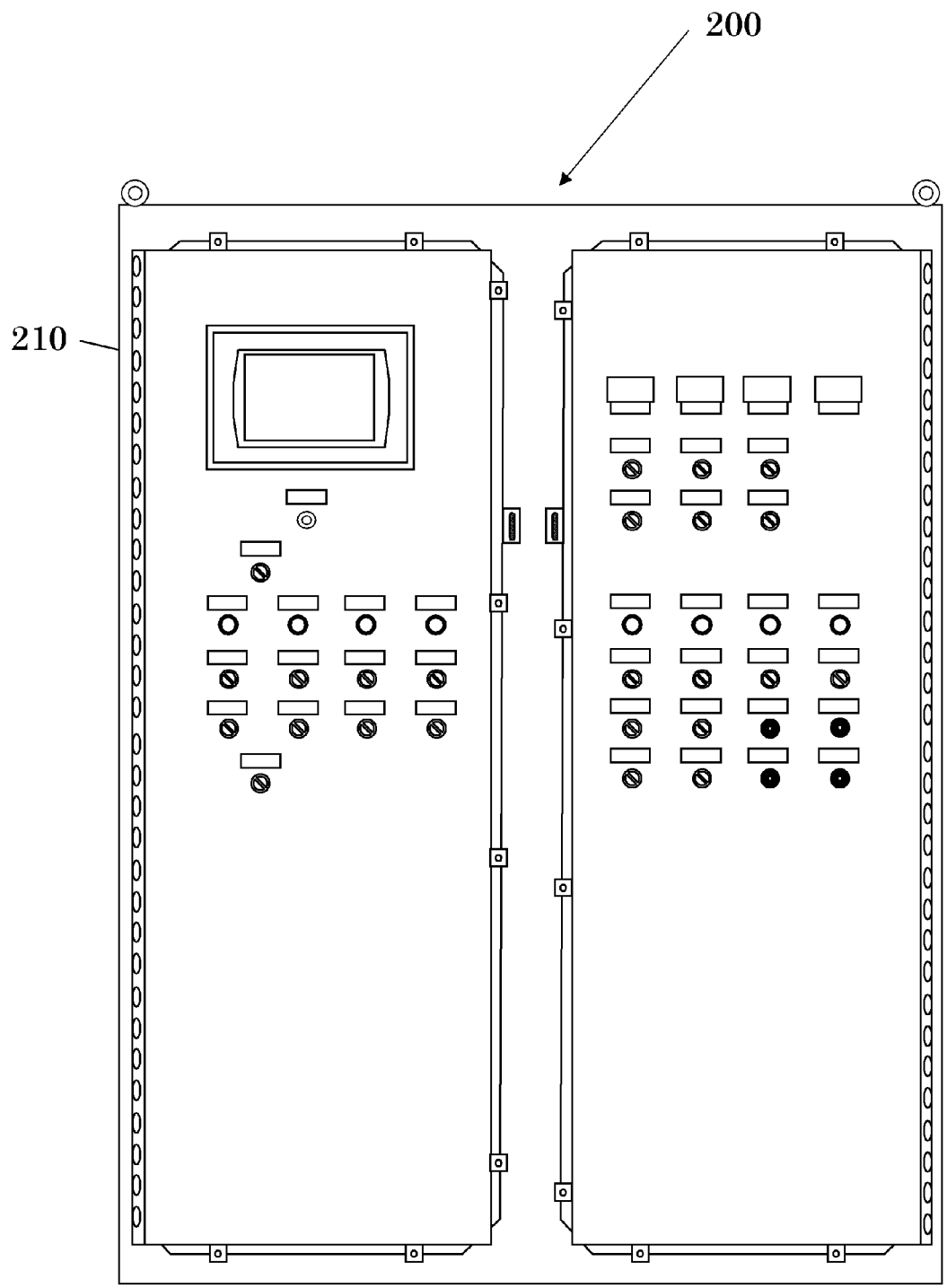
FIG. 11 is a front plan view of a control system according to one embodiment of the present invention.

According to one embodiment shown in FIG. 11, control system 200 provides a control screen 210 for displaying a graphic user interface between the subduing gas storage, conveyor system 20, circulation fans within the chamber 64, the temperature of the subduing gas, and gas injection ports 75. Further, control system 200 includes manual adjustment knobs and mechanisms for each of the controls, in the event that the computerized processor within control system 200 malfunctions. A screen shot of the control system 200 provides for automated control of each of these controls, allowing stunning system 10 to run as programmed. In addition, a screen shot wherein the percentage of subduing gas 13 is set for each stunning station, as well as the amount of time that cages 2 are to be exposed to the percentage of subduing gas 13 may be shown. In addition, an oxygen sensor may be used to determine the amount of oxygen that has been displaced by subduing gas 13, with the oxygen percentage being displayed on control screen 210. Further, as can be seen, sensors may be used in the working floor of the production facility to monitor carbon dioxide levels within the facility to ensure that safe levels are maintained for any workers on the production floor. The levels sensed by these sensors can be displayed on control screen 210.

Figure 9:
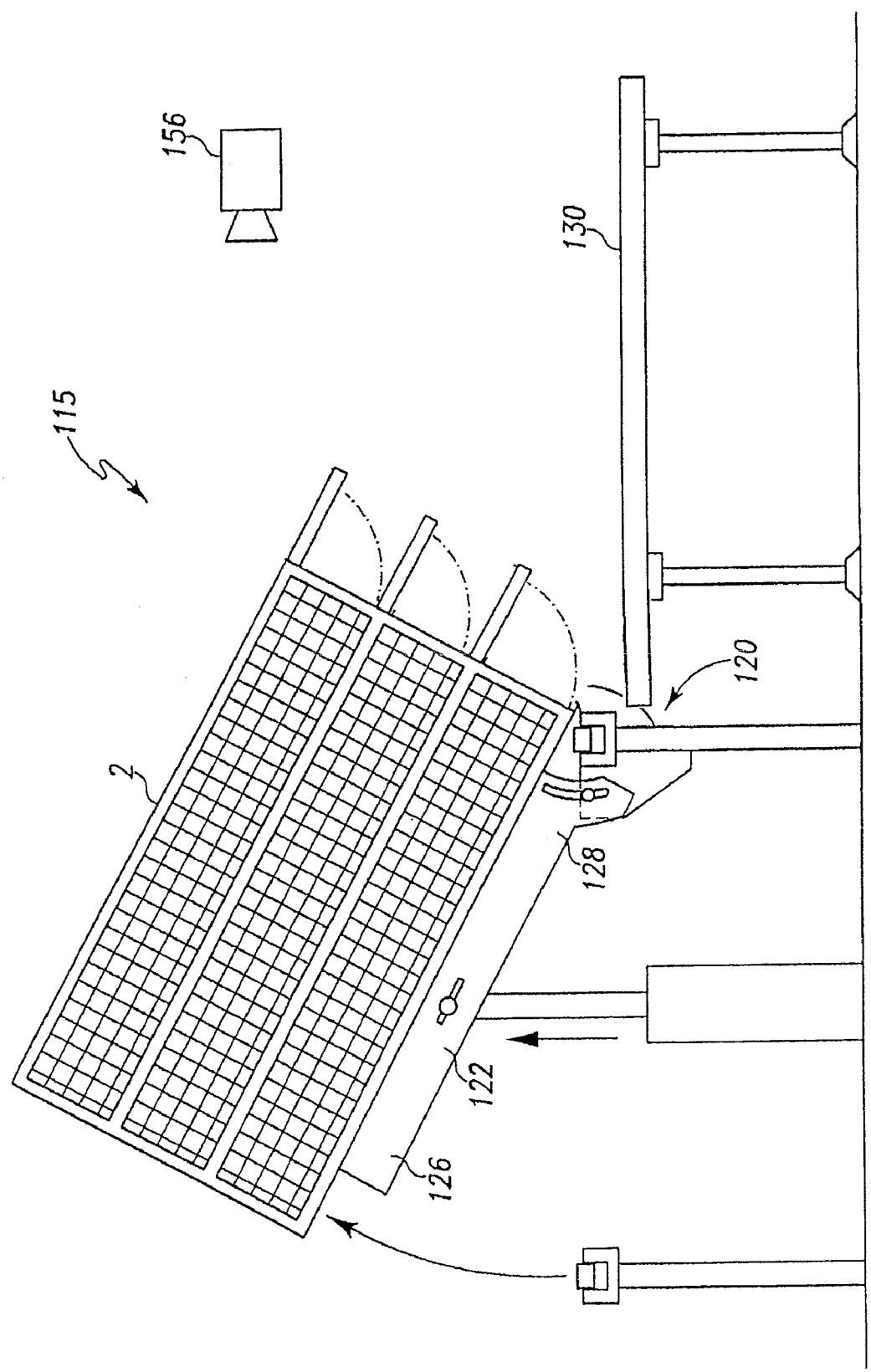
FIG. 9 is a schematic sectional side view of the cage emptying station of the present invention looking toward the ending of the path, particularly illustrating the cages in the tipped orientation.

It will be appreciated that control system 200 allows an operator to adjust the amount of subduing gas 13 to a percentage within the range described above such that the operator can allow for differences in the weight of the birds delivered, the health of the birds delivered, the temperature, and the humidity of the environment. Since each load of birds may have varying size and health, such adjustment is desirable according to one embodiment of the present application, as an appropriate amount of subduing gas for one load may kill another load of birds. In addition, an appropriate amount of subduing gas 13 for another load of birds may not adequately affect a third load of birds. As such, the optional viewing portals each stunning apparatus 56 and a camera 156 as illustrated in FIG. 9 can be used to allow for adjustability of the system 10 as it is being used.

Additionally, it will be appreciated that control system 200 optionally utilizes a sensor within each stunning apparatus 56 to determine whether a cage is present. If a cage is not present, no subduing gas 13 is injected into the stunning apparatus. By utilizing such a sensor, subduing gas 13 is not unduly wasted, and there is less chance of increased levels of the subduing gas 13 within the working floor of the production facility.

IV. Post-Stunning Processes

Figure 8:
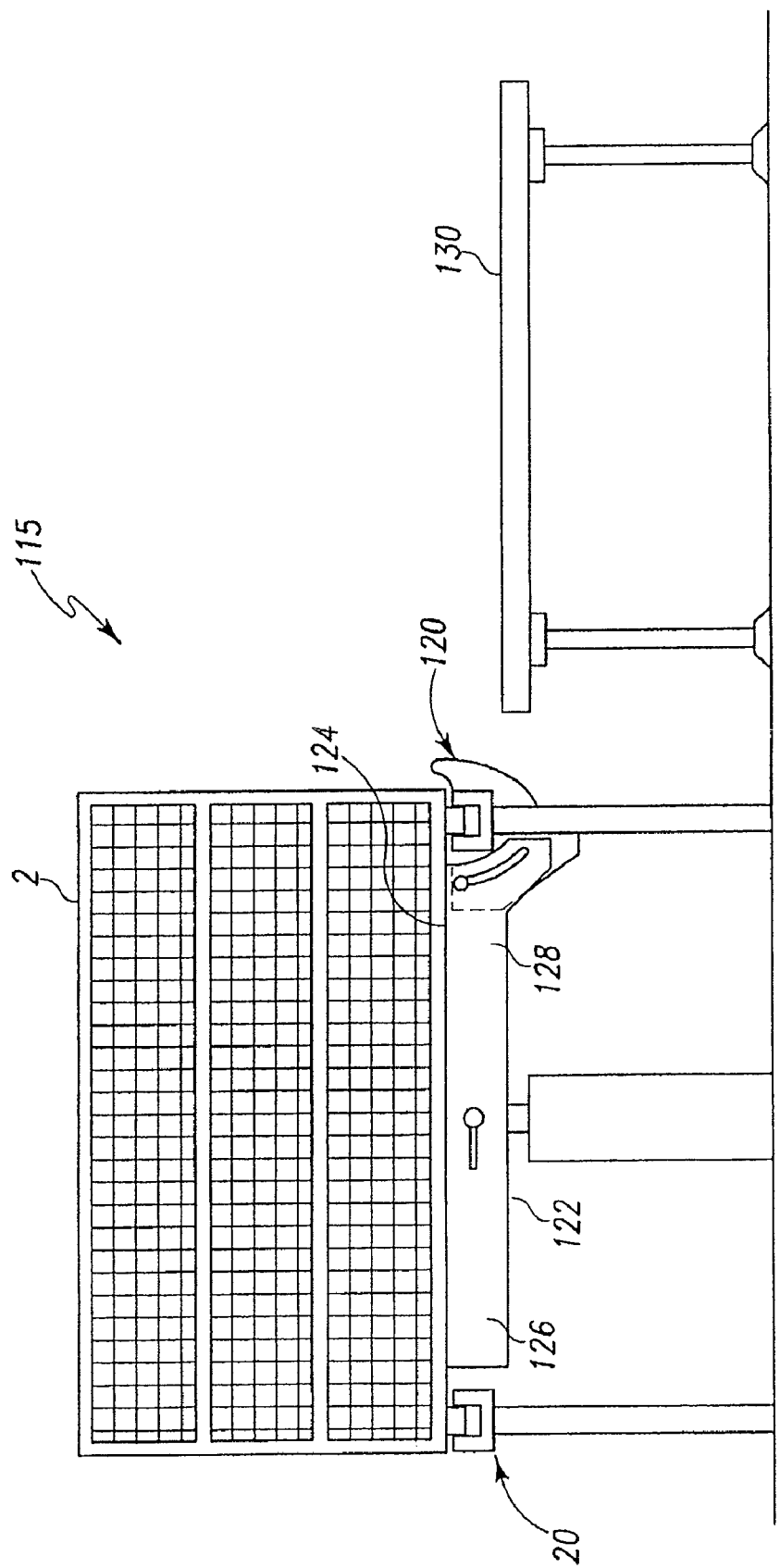
FIG. 8 is a schematic sectional side view of a cage emptying station of the present invention looking toward the ending of the path, particularly illustrating the cages in the normal orientation.

According to one embodiment of the present application, after cages 2 have progressed through the three stunning stations 110, 112, and 114, the cages further progress to cage emptying station 115, and are emptied so that the inactive, but live poultry can be euthanized or dispatched. As shown in FIGS. 8 and 9, to assist with the emptying of the cages 2, system 10 may optionally include an cage empty apparatus 120 for emptying the stunned birds from the cages 2 that are moving along the path 14. The cage empty apparatus 120 may comprise an unload table 122 that is positioned along the path 14 after stations 110, 112, 114, and below the upper support plane 22 of the conveyor 20 so that the top 124 of the unload table 122 does not interfere with the regular movement of cages 2 along the path 14. The unload table 122 may be movable in a vertical direction, with a first portion 126 of the table 122 moving in an upward direction to a greater degree or distance than a second portion 128 of the unload table 122. The support plane may be inclined to an orientation of approximately 45 degrees with respect to the horizontal. The tipping of the cages 2 on the unload table 122 may thus cause the birds in the cages 2 to fall out of the cages 2 onto an unload area 130 that is positioned at or below the conveyor 20 that direct the birds to an area where the birds can be further processed, it being understood that cages 2 are supplied with gates or side portions that are unlocked from their closed position before or during the emptying process. After the birds have moved out of the cages 2, or after a predetermined period of time, the unload table 122 may return to the substantially horizontal orientation. The apparatus for moving the unload table 122 upward is known to those skilled in the art, and may include at least one actuator that pivots the unload table above an axis located toward one end of the table 122.

Finally, once the cages 2 are emptied, as shown in FIG. 10, system 10 may optionally include a cage washing station 142. Cage washing station 142 optionally comprises a washing apparatus for washing the cages 2 moving along the path 14 after the birds have been unloaded from the cages. The conveyor 20 may extend through the washing apparatus, with cages 2 preferably retaining the spacing therebetween that exists in the earlier stages or sections of the system 10. In the washing apparatus section of the path 14, the conveyor 20 extends past a spraying assembly 144 that directs a fluid flow toward and through cages 2 moving along the path 14. The spraying assembly 144 may comprise a plurality of sprayers 146, 148 that are positioned on at least one, and preferably both, sides of the path 14 and are oriented to direct cleaning fluid inwardly toward the path. The plurality of sprayers 146, 148 may be arranged in a plurality of stations, and illustratively the spraying assembly includes three stations 150, 152, 154. In one embodiment of the invention, the conveyor 20 has vertical undulations that raise and lower portions or sides of cages 2 as the cages move along the path 14 between the plurality of sprayers and through the stations. Illustratively, the first lateral side of the conveyor 20 may undulate upwardly for the first location 150 of sprayers, while the second lateral side of the conveyor may remain at a lower level relative to the first lateral side, such as, for example, a level that is substantially the same level as the conveyor entering the washing apparatus 142. By this structure, cages 2 are effectively tipped or rotated toward the second lateral side of the conveyor, and sprayers located on the second lateral side are able to more effectively spray into the interior of cages 2 through the tops of the cages. At the second location 152 of sprayers, the conveyor along the second lateral side may undulate upward, while the conveyor along the first lateral side is located at a relatively lower elevation, thus functioning to tip or rotate the cages 2 on the conveyor toward the first lateral side of the conveyor. Sprayers located on the first lateral side of the conveyor are then able to spray into the interior of the cages through the tops of the cages. At the third location 154, the upper support plane 22 of the conveyor 20 is substantially level, and sprayers located at both lateral sides of the conveyor are able to spray into the cages at equal effectiveness.

After passing through the washing apparatus 142, the cages 2 may move off of the ending 18 of the path 14, and may drop onto a surface as the chain of the conveyor 20 turns downwardly and moves in an inverted orientation toward the beginning 16 of the conveyor.

Optionally, the system 10 may include a camera 156 that is positioned to take a picture of the cages and the birds therein at the final station, which is the third station in the illustrative embodiment, to verify that the birds are stunned after being moved through the final station 114 of the stunning apparatus.

As a further option, where variable times of exposure are desired in different stations, the distance between the entry 78 and exit 80 openings of the chamber 64 of the stunning stations may be different, so that the time that each of the cages are in the plenum chambers is varied between the stations if the conveyor moves at a constant speed. For example, the distance between the entry and exit openings of the third stations 114 is approximately three times the distance between the same elements of the first station 110, and the distance between the entry and exit opening of the plenum of the second station 112 is approximately twice the distance between the same elements of the first station 110. In such a configuration, the cages 2 moving along the path 14 will spend approximately three times as much time in the third station 114 as the first station 110, and approximately two times as much time-in the second station 112 as the first station 110.

With respect to the above description then, it is to be realized that the optimum dimensional relationships for the parts of the invention, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A system for stunning poultry located in cages, the system comprising:
   a. a conveyor system operable to move said cages along a path having a beginning and an ending;
   b. at least three stunning stations located along the path and located between the beginning and the ending of the path, wherein each stunning station is operable to provide an amount of a subduing gas into the stunning station to create and maintain a predetermined concentration of the subduing gas in the stunning station once a cage enters the stunning station; and
   c. wherein the predetermined concentration of the subduing gas for a first station is less than the predetermined concentration of the subduing gas for a second station, and wherein the predetermined amount of the subduing gas for a third station is more than the predetermined concentration for the second station.

2. The system of claim 1 wherein the first station is infused with a predetermined concentration of subduing gas that causes the poultry in the cages feel slightly tired, and wherein the second stunning station is infused with a predetermined concentration of subduing gas that causes the poultry in the cages to sit down with their heads up, and a third stunning station is infused with a predetermined concentration of subduing gas that causes the brain of the poultry to be inactive but the heart to continue pumping blood.

3. The system of claim 2, wherein the subduing gas is carbon dioxide.

4. The system of claim 2 additionally comprising emptying means adjacent to the end of the path after the last stunning station, said emptying means operable to empty inactive poultry from the cages moving along the path.

5. The system of claim 1, wherein the predetermined concentration of the subduing gas for the first station is approximately 8% to approximately 19% by volume, and where the predetermined concentration of the subduing gas for the second station is approximately 34% to approximately 44% by volume, and wherein the predetermined concentration of the subduing gas for the first station is approximately 81% to approximately 89% by volume.

6. The system of claim 5 wherein the subduing gas is carbon dioxide.

7. The system of claim 6, further comprising a humidifier within at least one of the stunning stations operable to increase the humidity within the stunning apparatus.

8. The system of claim 5, wherein the cages are exposed to the predetermined concentration of the subduing gas for approximately 30-70 seconds at each station.

9. The system of claim 5, wherein the cages are exposed to the predetermined concentration of the subduing gas for approximately 45-66 seconds at each station.

10. The system of claim 5, wherein the cages are exposed to the predetermined concentration of the subduing gas for approximately 45-52 seconds at each station.

11. The system of claim 1, further comprising a system controller operable to adjust the predetermined concentration of subduing gas in each station, and operable to control the conveyor system for controlling the amount of time each cage is positioned within a stunning apparatus.

12. The system of claim 1 wherein the conveyor system is substantially porous to permit gas to pass through an upper support plane.

13. The system of claim 1 additionally comprising loading means for loading poultry cages onto the conveyor system.

14. The system of claim 1, wherein each stunning station further comprises a ventilation system for mixing the air within the stunning station with the subduing gas.

15. The system of claim 1, wherein the cages comprise at least two tiers operable to hold approximately 40 or more turkeys of approximately 38 to 42 pounds each.

16. The system of claim 15, wherein the cages comprises at least three tiers operable to hold approximately 40 or more turkeys of approximately 38 to 42 pounds each.

17. The system of claim 1, further comprising an emptying station operable to lift a cage at an angle to assist with emptying the poultry located within the cages.

18. The system of claim 17 additionally comprising washing means positioned along the path for spraying fluid into the cages, the washing means being positioned after the emptying station and adjacent to the end of the path.

19. A system for stunning poultry located in cages, the system comprising:
   a. at least one set of cages comprising a plurality of tiers for holding the poultry,
   b. a conveyor system operable to move said at least one set of cages along a path having a beginning and an ending;
   c. a plurality of stunning stations located along the path and located between the beginning and the ending of the path, wherein each stunning station is operable to receive the at least one set of cages having a plurality of tiers without substantially altering the vertical path of the at least one cage, and wherein each stunning station is operable to release a predetermined concentration of a subduing gas into the stunning station once at least one cage enters the stunning station; and
   d. wherein the predetermined concentration of the subduing gas is circulated throughout the stunning station in a manner such that the subduing gas is substantially homogenously mixed with the remaining air in the stunning station to help ensure that the poultry in each tier is exposed to approximately the same concentration of the subduing gas.

20. The system of claim 19, wherein the plurality of tiers is two or more tiers.

21. The system of claim 19, wherein the plurality of tiers is three or more tiers.

22. The system of claim 19, wherein the one set of cages comprises a single cage having a plurality of tiers.

23. The system of claim 19, wherein the one set of cages is formed by a vertical stacking of one or more cages having a single tier on top of one or more cages having a single tier or a plurality of tiers.

24. The system of claim 19, wherein the subduing gas is carbon dioxide.

25. The system of claim 19, wherein each stunning station includes a sensor operable to preclude infusion of the subduing gas if a cage is not present.

26. The system of claim 19, wherein each stunning station further comprises a heater operable to head the subduing gas prior to introducing the subduing gas within the stunning station.

27. A system for stunning poultry located in cages, the system comprising:
   a. at least one set of cages comprising a plurality of tiers for holding the poultry,
   b. a conveyor system operable to move said at least one set of cages along a path having a beginning and an ending;
   c. a plurality of stunning stations located along the path and located between the beginning and the ending of the path, wherein each stunning station is operable to receive the at least one set of cages having a plurality of tiers without substantially altering the vertical path of the at least one cage, and wherein each stunning station is operable to release a predetermined concentration of a subduing gas into the stunning station once at least one cage enters the stunning station; and
   d. wherein the predetermined concentration of the subduing gas is circulated throughout the stunning station in a manner such that the subduing gas is substantially homogenously mixed with the remaining air in the stunning station to help ensure that the poultry in each tier is exposed to approximately the same concentration of the subduing gas.

28. The system of claim 27 wherein each cage is exposed to each stunning station for a period of time of about 30 to about 70 seconds.

29. The system of claim 27, wherein a transit time for each cage between stations on the conveyor system is about 30 seconds.

30. The system of claim 27, wherein the second stunning station includes a humidifier operable to raise the humidity within the second stunning station.

31. The system of claim 27, wherein each stunning station includes a sensor operable to preclude infusion of the subduing gas if a cage is not present.

32. The system of claim 27, wherein the conveyor system does not substantially change the elevation of the cages during transit through the stunning stations.

33. The system of claim 27, wherein each stunning station includes a heater operable to heat the subduing gas prior to infusing the stunning station.

* * * * *